June 6, 1967 J. GRECO 3,323,308

CONSTANT FLOW, VARIABLE AREA HYBRID ENGINE INJECTOR

Filed April 9, 1964

Joe Greco,
*INVENTOR.*

United States Patent Office
3,323,308
Patented June 6, 1967

3,323,308
CONSTANT FLOW, VARIABLE AREA HYBRID ENGINE INJECTOR
Joe Greco, Huntsville, Ala., assignor to the United States of America as represented by the Secretary of the Army
Filed Apr. 9, 1964, Ser. No. 358,980
1 Claim. (Cl. 60—240)

The invention described herein may be manufactured and used by or for the Government for governmental purposes without the payment of any royalty thereon.

This invention relates to a device for controlling the flow of a propellant or oxidizer into the combustion chamber of hybrid rocket engine.

The propellant utilized in a hybrid rocket engine consists of a combination of liquid fuel with solid oxidizer or a liquid oxidizer in combination with a solid fuel. In either case it is imperative that the liquid which is fed into the solid rocket chamber be supplied at a constant predetermined rate in order to achieve maximum performance from the combination of the oxidizer and propellant. Flow regulators of various types are available and have been utilized in hybrid engines in the past. However, available regulators are generally bulky and heavy. In many cases available regulators have proved to be undependable under conditions of extreme acceleration or vibration.

My invention eliminates the deficiencies generally found in regulators which are utilized in hybrid rocket engines. My device is relatively small and light weight while being extremely simple in operation and therefore dependable. The present invention is especially suitable for use on hybrid engines in that it utilizes the existing high pressure fuel system as a motive force.

Accordingly one object of my invention is to provide a device which will accurately control the flow of liquid into the combustion chamber of hybrid rocket engine.

Another object of my invention is to provide a flow control device which is extremely light, relatively small and inexpensive.

Yet another object of my invention is to provide a device which is simple in operation and manufacture and yet exceedingly dependable under conditions of extreme forces and vibrations which occur in a missile system.

Still another object of my invention is to provide a flow control system which will utilize the existing pressure systems of hybrid rocket engines now in use.

This invention together with other objects and advantages thereof will be best understood by reference to the following description and accompanying drawings in which.

Figure 1:
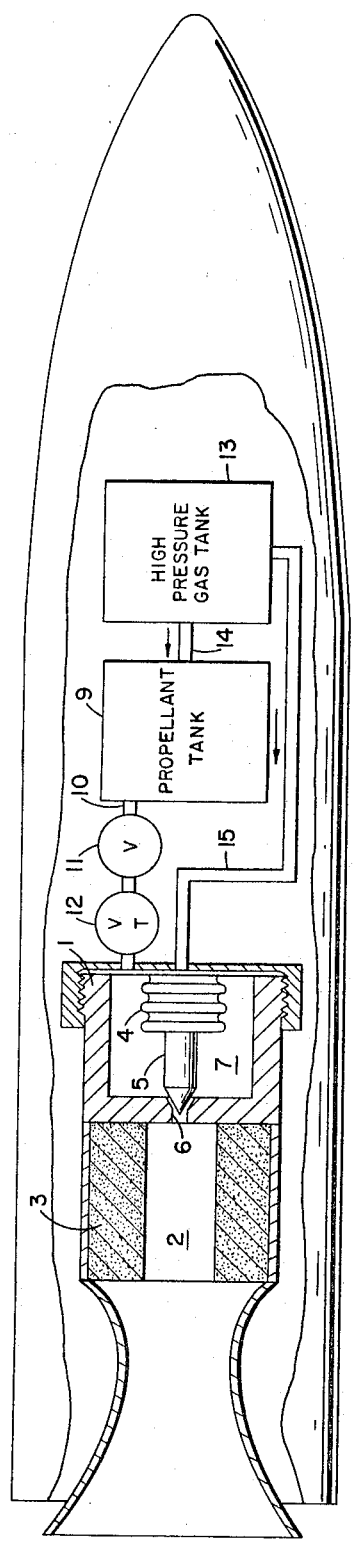
FIGURE 1 is a diagrammatic showing of the device as attached to a hybrid rocket engine within a missile which is partially cut away, the engine being shown in section for purposes of clarity.

Referring now to FIGURE 1, an injector housing 1 is attached immediately forward of a combustion chamber 2. Combustion chamber 2 is lined with a solid fuel compound 3 which may be either an oxidizer or a propellant depending upon the particular engine. Located within the injector housing is a pressure responsive bellows 4 which is attached to and adapted for actuation of a metering rod 5 so as to control the flow of fluid through an injector chamber 7. Liquid is supplied to the injector chamber from a tank 9 and flows through a line 10, a shutoff valve 11, a restrictor or throttle valve 12 and into the injector chamber. A high pressure gas tank 13 is connected in fluid communication with tank 9 and with bellows 4 by connector lines 14 and 15 respectively. Bellows 4 may be fabricated of metal or of any suitable substitute which will provide the proper resiliency.

Figure 3:
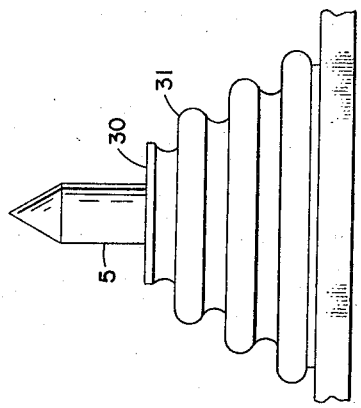
FIGURE 3 is an illustration of a modified bellows.
Figure 2:
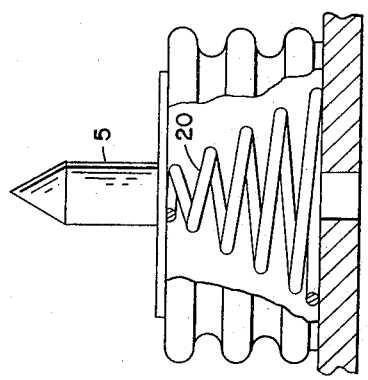
FIGURE 2 is a view of a modified bellows and spring arrangement.

FIGURES 2 and 3 illustrate bellows arrangements which are necessary to compensate for the pressure variations and differentials which occur in and between the high pressure gas tank and the injector housing. These pressure variations may be caused by depletion of the liquid within the propellant tank or by temperature changes in the tanks and their contents. It will be obvious that the pressure within the high pressure tank will decrease as the liquid in tank 9 is fed to the engine. Accompanying this pressure drop is a change in the pressure differential which exists between tank 9 and the injector housing because of throttle valve 12. This continuing change in the pressure differential would cause a slight change in the flow rate into chamber 2 unless the bellows is provided with a means by which the force required to open or close the injector orifice 6 is varied in response to the relative position of metering rod 5. The bellows illustrated in FIGURE 2 is provided with a tensionally mounted variable rate spring 20 which will exert a constantly varying non-linear force as it is compressed or expanded. The strength of spring 20 will depend upon the particular pressure from the high pressure gas tank that is utilized to load the liquid of the propellant tank. This is true since this system is adapted for use on different sizes of rocket engines. The bigger the rocket engine, the stronger spring 20 will have to be. Spring 20 will exert its greatest force in the expanded position and its least force in the contracted position. The modification illustrated in FIGURE 3 operates under a similar principle to that of FIGURE 1 but bellows 30 utilizes the varying diameter of its resilient convolutes 31 to provide a varying non-linear spring rate without the use of an addition variable rate non-linear spring. That is, bellows 30 has the non-linear spring action built into convolutes 31 thereof.

In operation of the device, the liquid in tank 9 is forced through throttle valve 12 and into the injector housing by the pressure in the high pressure tank 13. The pressure existing in the high pressure tank is also exerted upon the interior of bellows 4. Thus it will be seen that the combination of forces within and around the bellows plus the force exerted by the natural resiliency of the bellows itself will cause a balance which will determine the position of metering rod 5 relative to orifice 6. If the pressure within the high pressure tank increases the pressure within the injector will also increase to cause a potential flow increase through orifice 6 unless metering rod 5 is readjusted relative to orifice 6. However, with applicant's device the position of metering rod 5 will immediately move toward injector orifice 6 as the pressure in the high pressure tank increases due to the change in differential of pressure across the bellows and an increase in spring force as the bellows moves to thus instantaneously prevent a flow increase through orifice 6. As pointed out above the characteristic resiliency of the bellows may be of a varying degree to add further to the accuracy of the device.

It is thus apparent that the present invention provides a constantly correcting flow control system capable of compensating for variations in missile temperature as well as variations in its liquid fuel supply.

While the foregoing is a description of the preferred embodiment, the following claim is intended to include those modifications and variations that are within the spirit and scope of my invention.

I claim:

A constant flow injector for hybrid rocket engines comprising an injector housing having a metered orifice at one end thereof that opens directly into the combustion chamber of the hybrid rocket engine, a pressure sensitive device mounted within said housing and including a metallic bellows with a frusto-conical variable rate spring mounted in tension within the bellows to bias the bellows in a direction away from said orifice, a metering rod connected to said pressure sensitive device, said metering rod being adapted for movement within said metered orifice, a gas tank having a source of high pressure gas connected to said pressure sensitive device, a liquid propellant tank connected for fluid communication to said injector housing, a fluid restrictor connected between said propellant tank and said injector housing, fluid connecting means between said high pressure gas tank and liquid tank equalizing the gas pressure over the liquid propellant with that of the high pressure gas in said high pressure gas tank, whereby the flow of liquid from said liquid tank through said injector housing is controlled by the pressure within said high pressure gas tank and said pressure sensitive device.

References Cited
UNITED STATES PATENTS

| | | | |
|---|---|---|---|
| 2,398,201 | 4/1951 | Young et al. | 60—35.6 |
| 2,631,426 | 3/1953 | Jewett | 60—39.46 |
| 3,159,104 | 12/1964 | Hodgson | 60—35.6 |
| 3,172,254 | 3/1965 | Wright | 60—39.27 |
| 3,213,614 | 10/1965 | Leslie et al. | 60—35.6 |

MARK NEWMAN, *Primary Examiner.*

SAMUEL FEINBERG, *Examiner.*

D. HART, *Assistant Examiner.*